United States Patent
Neal et al.

(10) Patent No.: US 12,476,576 B2
(45) Date of Patent: Nov. 18, 2025

(54) BALLAST SYSTEMS FOR SECURING PHOTOVOLTAIC MODULES

(71) Applicant: Unirac Inc., Albuquerque, NM (US)

(72) Inventors: Jonathan Neal, Albuquerque, NM (US); Nikhil Babu, Hyderabad (IN); Ernest Gallegos, Albuquerque, NM (US); Deepthi Gangumalla, Hyderabad (IN)

(73) Assignee: Unirac, Inc., Albuquerque, NM (US)

(*) Notice: Subject to any disclaimer, the term of this patent is extended or adjusted under 35 U.S.C. 154(b) by 487 days.

(21) Appl. No.: 17/851,996

(22) Filed: Jun. 28, 2022

(65) Prior Publication Data

US 2023/0216441 A1    Jul. 6, 2023

Related U.S. Application Data

(63) Continuation of application No. 29/834,009, filed on Apr. 8, 2022, now Pat. No. Des. 1,036,219.

(60) Provisional application No. 63/297,177, filed on Jan. 6, 2022.

(51) Int. Cl.
*H02S 20/24* (2014.01)
*H02S 30/10* (2014.01)

(52) U.S. Cl.
CPC ............. *H02S 20/24* (2014.12); *H02S 30/10* (2014.12)

(58) Field of Classification Search
CPC ........... F24S 25/16; F24S 40/85; H02S 20/24; H02S 30/10
See application file for complete search history.

(56) References Cited

U.S. PATENT DOCUMENTS

| | | |
|---|---|---|
| D267,625 S | 1/1983 | Dark |
| D296,517 S | 7/1988 | Martin |
| D329,007 S | 9/1992 | Yoder |
| D334,524 S | 4/1993 | Pinkney |
| D348,816 S | 7/1994 | Degen |
| D365,263 S | 12/1995 | Sorensen |
| D375,440 S | 11/1996 | Yoder |
| D393,998 S | 5/1998 | Anderson |

(Continued)

FOREIGN PATENT DOCUMENTS

| | | | | |
|---|---|---|---|---|
| DE | 202004005224 U1 * | 6/2004 | ............ | F24S 25/65 |
| DE | 202009012226 U1 | 4/2010 | | |
| WO | WO-2013059370 A1 * | 4/2013 | ............ | F24S 25/11 |

OTHER PUBLICATIONS

Search Report and Written Opinion mailed Aug. 18, 2023 for PCT Application No. PCT/US23/60239, 11 pgs.

(Continued)

*Primary Examiner* — Kourtney R S Carlson
(74) *Attorney, Agent, or Firm* — Lee & Hayes, P.C.

(57) ABSTRACT

A ballast system includes a first ballast tray and a second ballast tray. The first ballast tray has a first side profile including a south leg connected to a north leg. The second ballast tray has a second side profile that is different than the first side profile. A length of the north leg of the second side profile is greater than a length of the south leg of the first side profile, and a height of the north leg of the second side profile is substantially equal to a height of the south leg of the first side profile. The north leg of the second side profile includes a curvature so as to partially curve toward the south leg of the second side profile.

20 Claims, 10 Drawing Sheets

(56) References Cited

U.S. PATENT DOCUMENTS

| | | |
|---|---|---|
| D435,417 S | 12/2000 | Miller |
| D435,771 S | 1/2001 | Miller |
| D719,000 S | 12/2014 | Palmer |
| D765,581 S | 9/2016 | Pumphrey |
| D798,138 S | 9/2017 | Smith |
| D940,523 S | 1/2022 | Nana |
| D980,694 S | 3/2023 | Divitcoff |
| D990,679 S | 6/2023 | Opperman |
| D996,373 S | 8/2023 | Michael |
| D996,608 S | 8/2023 | Bowman |
| D997,888 S | 9/2023 | Michael |
| D1,002,355 S | 10/2023 | Osuga |
| D1,002,356 S | 10/2023 | Asai |
| D1,008,453 S | 12/2023 | Hennings |
| D1,008,786 S | 12/2023 | Limber |
| D1,011,174 S | 1/2024 | Michael |
| D1,012,042 S | 1/2024 | Michael |
| 2010/0212714 A1* | 8/2010 | Rothschild ............... H02S 20/00 248/346.03 |
| 2012/0048351 A1* | 3/2012 | Rizzo ..................... F24S 25/16 136/251 |
| 2013/0000219 A1* | 1/2013 | Kudav ..................... F24S 25/16 52/84 |
| 2014/0069485 A1 | 3/2014 | Rawlings et al. |
| 2015/0349700 A1* | 12/2015 | Port ........................ F24S 25/50 52/173.3 |
| 2015/0377521 A1* | 12/2015 | Port ........................ F24S 25/63 248/499 |
| 2016/0336895 A1* | 11/2016 | Wildes ..................... H02S 20/10 |
| 2018/0323742 A1 | 11/2018 | Dick et al. |

OTHER PUBLICATIONS

Office Action for U.S. Appl. No. 29/834,009, mailed on Dec. 29, 2023, Gallegos, "Ballast System Tray Component", 7 Pages.

Office Action for US Patent Application Mar. 25, 2024, Gallegos, "Ballast System Tray Component", 5 pgs.

RM 10 EVO Detail Drawings. Dec. 10, 2021. Unirac. retrieved at <<https://unirac.com/wp-content/uploads/bsk-pdf-manager/2022/06/RM 10-X EVO-Detail-Drawings.pdf>, 12 pgs.

Solar support brackets. (Design -© Questel) orbit.com., Retrieved Mar. 6, 2024, [Online PDF compilation of references selected by examiner] Print Dates Range Jun. 9, 2023-Jun. 24, 2020, 48 pgs.

Unirac 310710 RoofMount Ballast Bay. 2024. RES Supply. Retrieved at <<https://ressupply.com/racking-and-mounting/unirac-310710-roof-mount-ballast-bay>>, 2 pgs.

Unirac RoofMount 310710 Ballast Bay. 2021. Pixellove, retrieved at <<https://pixelovear.xyz/product_details/21113176.html>>, 4 pgs.

Sunwatts, "UniRac 10 degree RoofMount Ballast Bay", retrieved Feb. 25, at <<https://sunwatts.com/unirac-10-degree-roofmount-ballast-bay/?srsltid=Afm BOoq9IXvTUdQoH uVBQ Bsppuo0zP K8pk14qvFc6pS NM i7cAUVitatZ>>, 2025, 3 pgs.

* cited by examiner

BALLAST SYSTEMS FOR SECURING PHOTOVOLTAIC MODULES

RELATED APPLICATIONS

This application claims priority to: U.S. Provisional Patent Application No. 63/297,177, filed on Jan. 6, 2022; U.S. Design patent application No. 29/834,009, filed on Apr. 8, 2022; and U.S. Design patent application No. 29/834,017, filed on Apr. 8, 2022; the entire contents of which are incorporated herein by reference.

BACKGROUND

As the solar energy industry continues to grow, the equipment to mount photovoltaic (PV) modules (alternatively referred to herein in some instances as "solar panels") on different types of structures and/or locations continues to adapt and improve as well. Though a variety of apparatuses exist to secure the PV modules and/or anchor PV module mounting assemblies, the number of parts and or different arrangements of the parts still leave much to be desired for an efficient and quick assembly to minimize the amount of time a worker may be working on a roof or in a similarly physically demanding or potentially hazardous condition.

The PV module is typically used as a component of a larger PV system to generate and supply electricity in commercial and residential applications. Because a single PV module can only produce a limited amount of power, most installations contain several PV modules to form a PV array. The PV array is often mounted on a building rooftop or simply on the ground with each of the PV modules in a fixed position facing generally south.

There are many mounting systems for securing PV modules to rooftops that adequately withstand wind loads. However, disadvantages among the existing mounting systems abound, including not being environmentally friendly, being relatively expensive to produce, being time consuming to install, requiring custom fabrication to match different types or brands of PV modules, and/or causing damage to the rooftop/surface on which the mounting equipment is placed, for example, by penetrating a roof membrane. Also, some existing mounting systems occupy an excessive amount of space, thereby decreasing the power density of the PV array. In some instances, the existing mounting systems also suffer from grounding capability concerns. Accordingly, there is room for improved mounting systems for PV modules.

BRIEF DESCRIPTION OF THE DRAWINGS

The Detailed Description is set forth with reference to the accompanying figures. In the figures, the left-most digit(s) of a reference number identifies the figure in which the reference number first appears. The use of the same reference numbers in different figures indicates similar or identical items. Furthermore, the drawings may be considered as providing an approximate depiction of the relative sizes of the individual components within individual figures. However, the drawings are not to scale, and the relative sizes of the individual components, both within individual figures and between the different figures, may vary from what is depicted. In particular, some of the figures may depict components as a certain size or shape, while other figures may depict the same components on a larger scale or differently shaped for the sake of clarity.

DETAILED DESCRIPTION

Overview

This disclosure is directed to a ballast system for securement and surface positioning of PV modules. More specifically, embodiments of the ballast system disclosed herein may be positioned on a roof or other surface and secured in place via weighted ballast material, so as to hold, in a desired position on the surface, solar panels that may subsequently be attached thereto. Additionally, this disclosure is directed to a ballast tray apparatus for implementation, as a second ballast tray (i.e., a "north bay" ballast tray, as described herein below), in the ballast system for securing PV modules on a surface.

The ballast system disclosed herein may include the combined use of first ballast trays (e.g., "field bay ballast trays") and second ballast trays (e.g., "north bay ballast trays") disposed in an array on a surface so that PV modules may be attached thereto and held in place even in the face of some significant weather events. The ballast system may be implemented by disposing one or more rows of first ballast trays adjacent to a row of second ballast trays to secure PV modules to a surface (e.g., a roof surface, a ground surface, etc.). The first ballast tray and the second ballast tray disclosed herein have intentionally distinct side profiles (referred to herein, respectively, as "the first side profile" and "second side profile"). In an embodiment of a ballast system that implements the use of a ballast tray having the first side profile (e.g., the "field bay" ballast tray) and a ballast tray having the second side profile (e.g., the "north bay" ballast tray), observations of such shows that the inclusion of the ballast tray having the distinct second profile provides a greater general downward resistance against undesired lift than that available when only ballast trays having the standard first profile are used.

That is to say, it is believed that the distinct shape of the second side profile of the second ballast tray provides an additional measure of protection against upward lift on the system, which lift is often caused by wind. More specifically, the use of a ballast tray having the second side profile (of the "north bay" ballast tray) draws PV modules back downward opposite a lift force in a manner that does not occur when compared with the use of a ballast tray having the first side profile (of the "field bay" ballast tray), in the northern position within the system, where "northern position" refers to the row being at the most northern end of the array, or else an outer row of the array.

Additional advantages of the embodiments of the ballast tray apparatus and the ballast system disclosed herein include but are not limited to: a ballast system that is easily securable to various types of flat support surfaces (e.g., pitch ranging of about 0 degrees to about 5 degrees); a PV module support device that does not penetrate the support surface; elimination of standard fasteners and assemblies, thereby reducing costs; and reduction of the overall cost and time to install a PV module system.

Illustrative Embodiments of Ballast Systems

Figure 1:
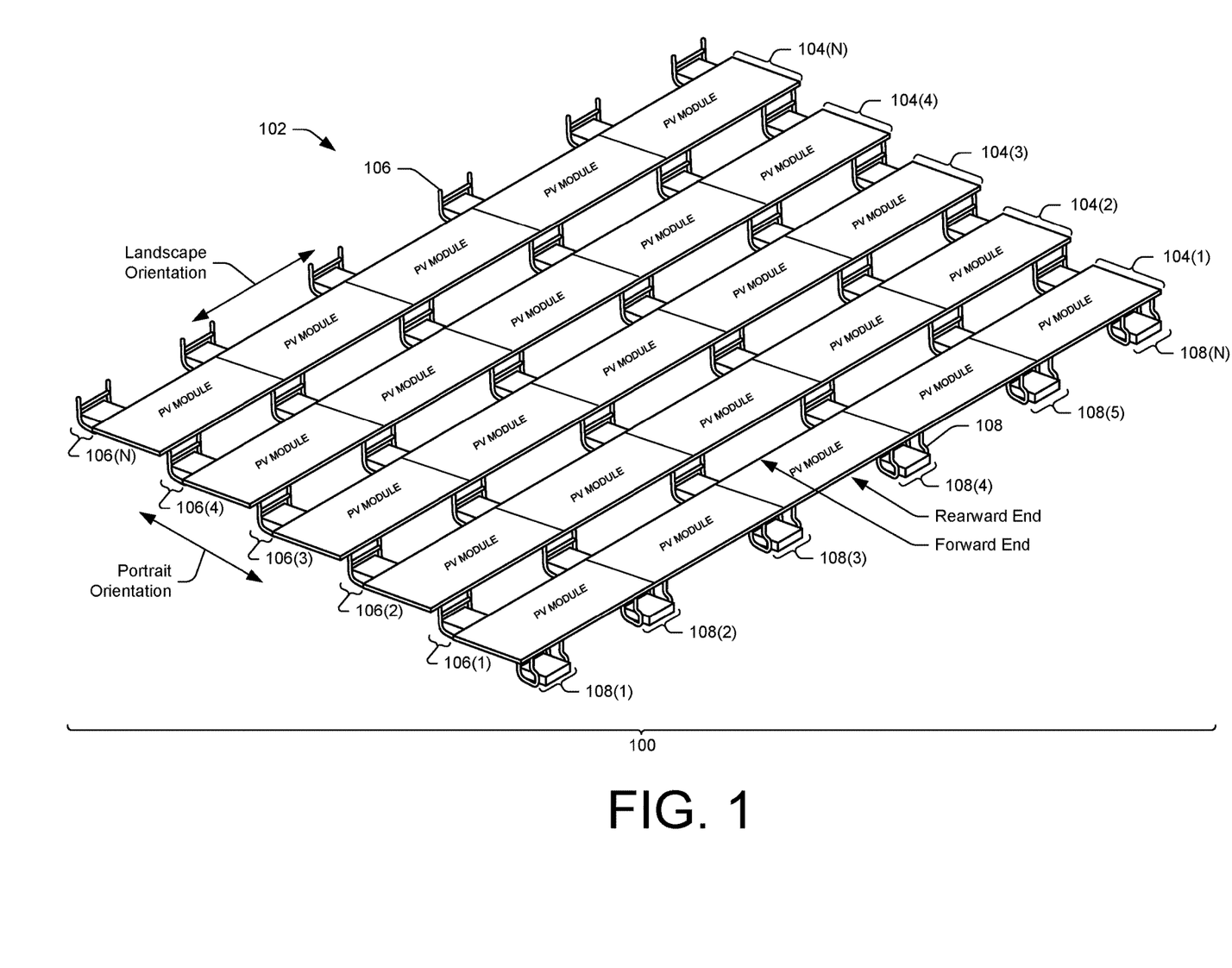
FIG. 1 illustrates a perspective view of a ballast system for securing PV modules, according to an embodiment of this disclosure.

FIG. 1 illustrates a perspective view 100 of a ballast system 102 for holding photovoltaic (PV) module arrays 104(1), 104(2), 104(3), 104(4), and 104(n) to a surface (not shown), according to an embodiment of this disclosure. The ballast system 102 may be implemented on various types of support surfaces (e.g., roof, flat, rocky ground, fields, etc.), though ideally, the system 102 is placed on substantially flat surfaces having a pitch ranging from 0 degrees to about 5 degrees.

The ballast system 102 includes a plurality of first ballast trays 106 (e.g., field bay ballast trays) which may be aligned in rows, as is depicted, for example, in one or more rows 106(1), 106(2), 106(3), 106(4), and 106(n). The ballast system 102 further includes a plurality of second ballast trays 108 (e.g., north bay ballast trays), which are aligned in a row together (see the row of ballast support trays 108 providing support, in part, for PV module array 104(1)) and, respectively, positioned at the ends of columns 108(1), 108(2), 108(3), 108(4), 108(5), and 108(n), which columns are thus formed with a respective second ballast tray 108 at a first end and aligned with one or more of the first ballast trays 106, respectively crossways aligned in the rows 106(1) ... 106(n). Notably, while it is considered that a user may desire more than one row of second ballast trays, the effect of providing a greater resistance to lift (discussed further below) is discernible even with only one row.

The first ballast trays 106 and the second ballast trays 108 rest on a support surface (not shown) to support (via attachment thereto) and orient the PV module arrays 104 (1)-104(n) above the support surface.

In an embodiment, the ballast system 102 allows for row-to-row grounding. This may be achieved with a continuous ground path from the one or more rows of first ballast trays 106 and the row of second ballast trays 108. For example, a continuous ground path goes from each row through module clamps (e.g., module clamps 302, 304, 402, 404, 902, or 1002 discussed in detail below), clamped to metal (e.g., aluminum, etc.) frames of the PV modules, continuing through the module clamps and subsequent rows of the first ballast trays 106 and/or the second ballast trays 108.

The illustrated PV module arrays 104(1)-104(n) have individual rectangular shaped PV modules oriented in a landscape orientation, that is, with the longest axis of the PV modules extending in a lateral or side-to-side direction which may be the east-west direction. It is noted, however, that the individual PV modules of the PV module arrays 104(1)-104(n) may alternatively be oriented by the first ballast trays 106 and the second ballast trays 108 in a portrait orientation, that is, with the longest axis of the PV modules extending in a forward-rearward direction which is typically the south-north direction. In either the portrait or landscape orientations, the illustrated PV modules are supported in an inclined position such that the forward end of each PV module is positioned lower than its rearward end so that typically the southern end is positioned lower than the northern end.

The individual PV modules of the PV module arrays 104(1)-104(n) are secured to the first ballast trays 106 and/or the second ballast trays 108 but each of the one or more first ballast trays 106 and/or the second ballast trays 108 is not directly secured to any of the other first ballast trays 106 and/or any of the other the second ballast trays 108. It is noted that while there is not a direct structural connection between the first ballast trays 106 and/or the second ballast trays 108, the first ballast trays 106 and/or the second ballast trays 108 are indirectly connected by the individual PV modules of the PV module arrays 104(1)-104(n) in a structural manner. That is, they are connected in a load carrying manner.

Securing the first ballast trays 106 and/or the second ballast trays 108, at or near the corners of individual PV modules of the PV module arrays 104(1)-104(n), and not directly connected (e.g., void of a direct connection) to one another, allows the first ballast trays 106 and/or the second ballast trays 108 to be used with PV modules of any width and length without requiring customization or modification to the first ballast trays 106 and/or the second ballast trays 108 or the PV modules. Thus, the first ballast trays 106 and/or the second ballast trays 108 can be used in many applications to mount many different models of PV modules. Also, the illustrated first ballast trays 106 and/or the second ballast trays 108 may not need be fastened to the support surface and may simply rest on the support surface as they are weighted in place by ballast. Therefore, the first ballast trays 106 and/or the second ballast trays 108 do not penetrate the support surface.

Figure 2:
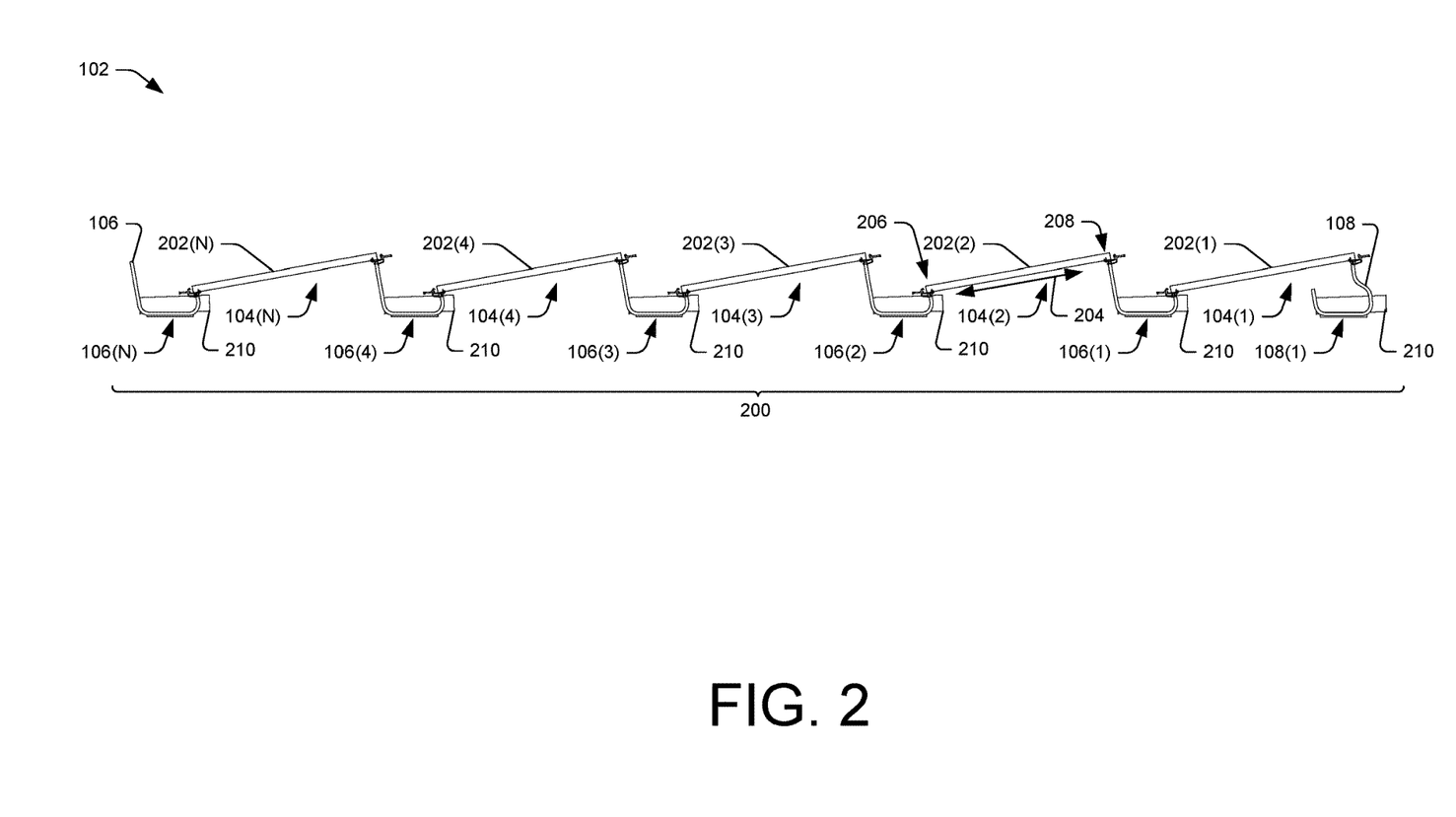
FIG. 2 illustrates a side view of the ballast system shown in FIG. 1, according to an embodiment of this disclosure.

FIG. 2 illustrates a side view 200 of the ballast system 102 shown in FIG. 1, according to an embodiment of this disclosure. FIG. 2 illustrates the PV module arrays 104(1)-104(n) have individual PV modules 202(1), 202(2), 202(3), 202(4), 202(N) that are each supported in an inclined position 204. As discussed above, the individual PV modules 202(1)-202(N) may be supported in the inclined position 204 such that a forward end 206 of each PV module 202(1)-202(N) is positioned lower than its rearward end 208. The lower forward end 206 of the individual PV modules 202(1)-202(N) may be a southern end and the higher rearward end 208 may be a northern end.

FIG. 2 illustrates the first ballast trays 106 and/or the second ballast trays 108 may be weighted in place by ballasts 210. The ballasts 210 may be in the form of ballast blocks that weight the first ballast trays 106 and/or the second ballast trays 108 to a support surface to maintain the position of the first ballast trays 106 and/or the second ballast trays 108 on the support surface. The ballast blocks 210 may be concrete ballast blocks, water ballast blocks, sand ballast blocks, etc.

Figure 3:
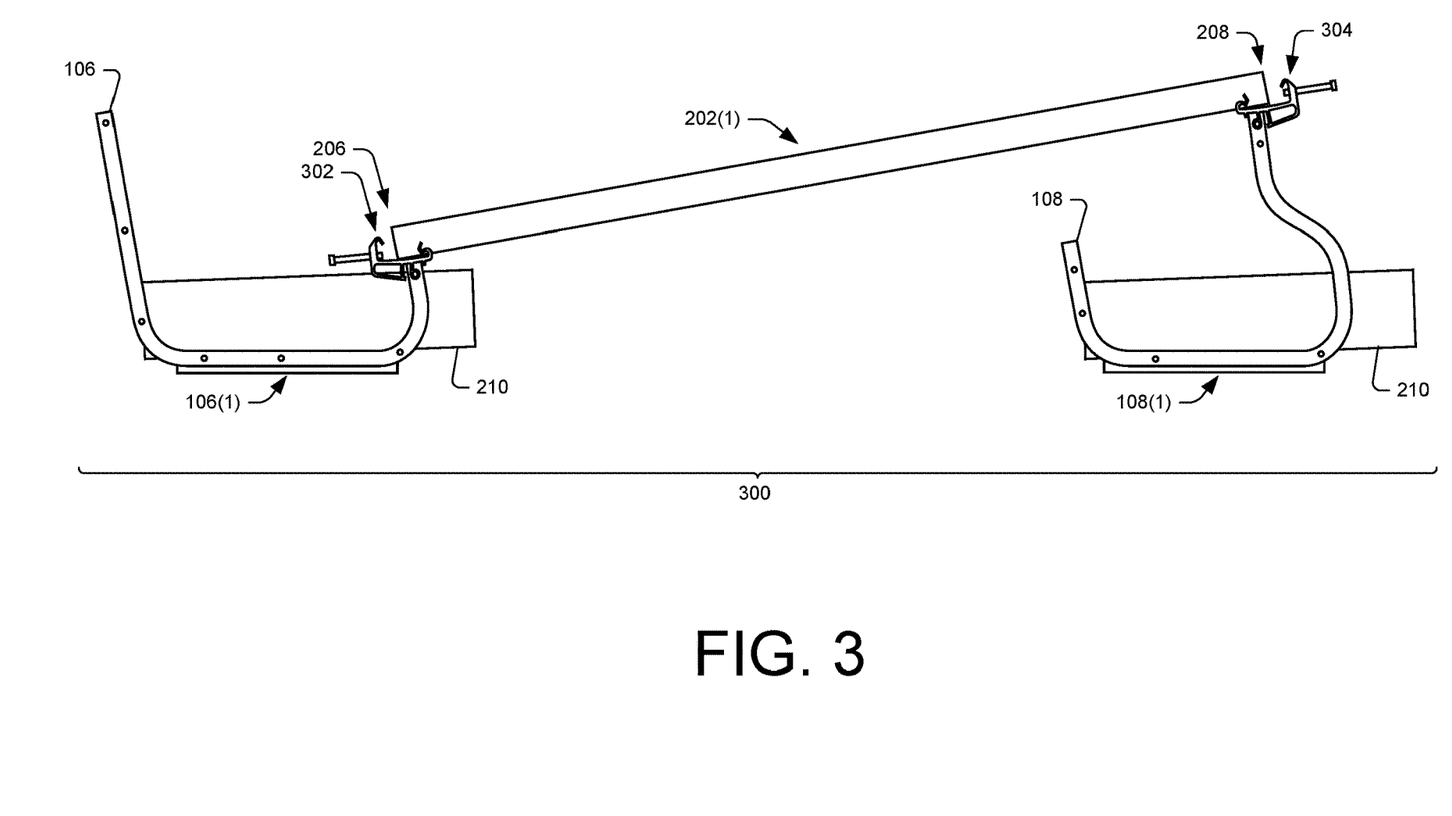
FIG. 3 illustrates a side view of a portion of the ballast system shown in FIGS. 1 and 2, according to an embodiment of this disclosure.

FIG. 3 illustrates a side view 300 of a portion of the ballast system 102 shown in FIGS. 1 and 2, according to an embodiment of this disclosure. FIG. 3 illustrates a module clamp 302 attached to the forward end 206 of the PV module 202(1) and attached to the first ballast tray 106. FIG. 3 further illustrates a module clamp 304 attached to the rearward end 208 of the PV module 202(1) and attached to the second ballast tray 108. The module clamp 302 may be fastened to the first ballast tray 106 via a bolt and clamped to the forward end 206 of the PV module 202(1). The module clamp 304 may be fastened to the second ballast tray 108 via a bolt and clamped to the rearward end 208 of the PV module 202(N). The module clamp 302 may be the same as the module clamp 304. The module clamp 302 and/or the module clamp 304 may electrically interconnect (e.g., ground) the PV module 202(1). The module clamp 302 and/or the module clamp 304 may have one or more portions (e.g., protrusion(s), serrations, teeth, etc.) for penetrating (e.g., pierce) a coating/layer (e.g., an anodized aluminum coating/layer) on the PV module 202(1). For example, as a nut (e.g., bonding cap 904 or star washer bonding nut 1004) of the module clamps 302 or 304 bites the metal frame of a PV module and removes anodization on the metal frame, electrical grounding of the PV modules is achieved.

Figure 4:
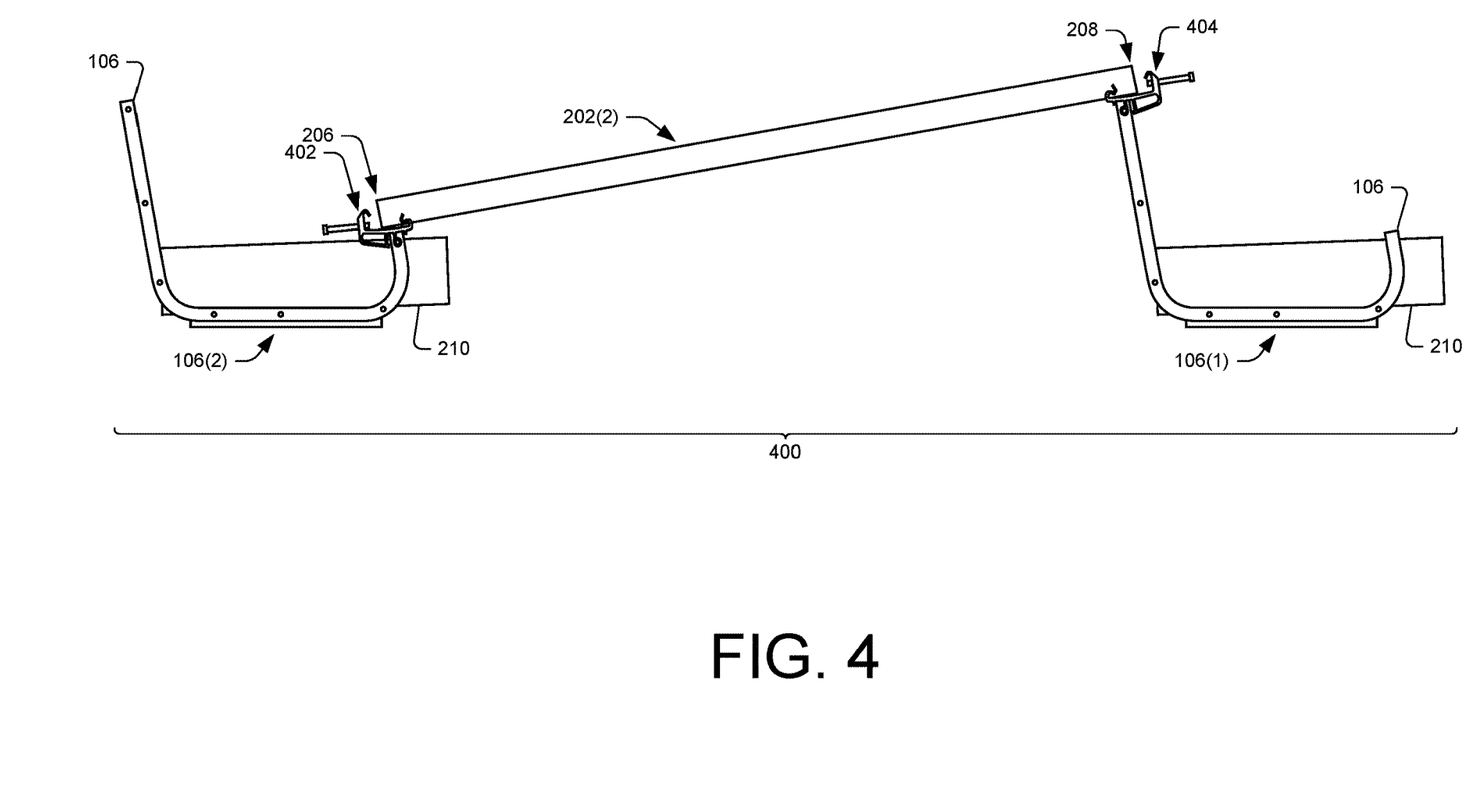
FIG. 4 illustrates a side view of another portion of the ballast system shown in FIG. 1, according to an embodiment of this disclosure.

FIG. 4 illustrates a side view 400 of a portion of the ballast system 102 shown in FIGS. 1 and 2, according to an embodiment of this disclosure. FIG. 4 illustrates a module clamp 402 is attached to the forward end 206 of the PV module 202(2) and attached to the first ballast tray 106 of the row 106(2). Further, a module clamp 404 is attach to the rearward end 208 of the PV module 202(2) and attached to the other first ballast tray 106 of the row 106(1). The module clamps 402 and 404 may be the same as the module clamps 302 and 304.

Figure 5:
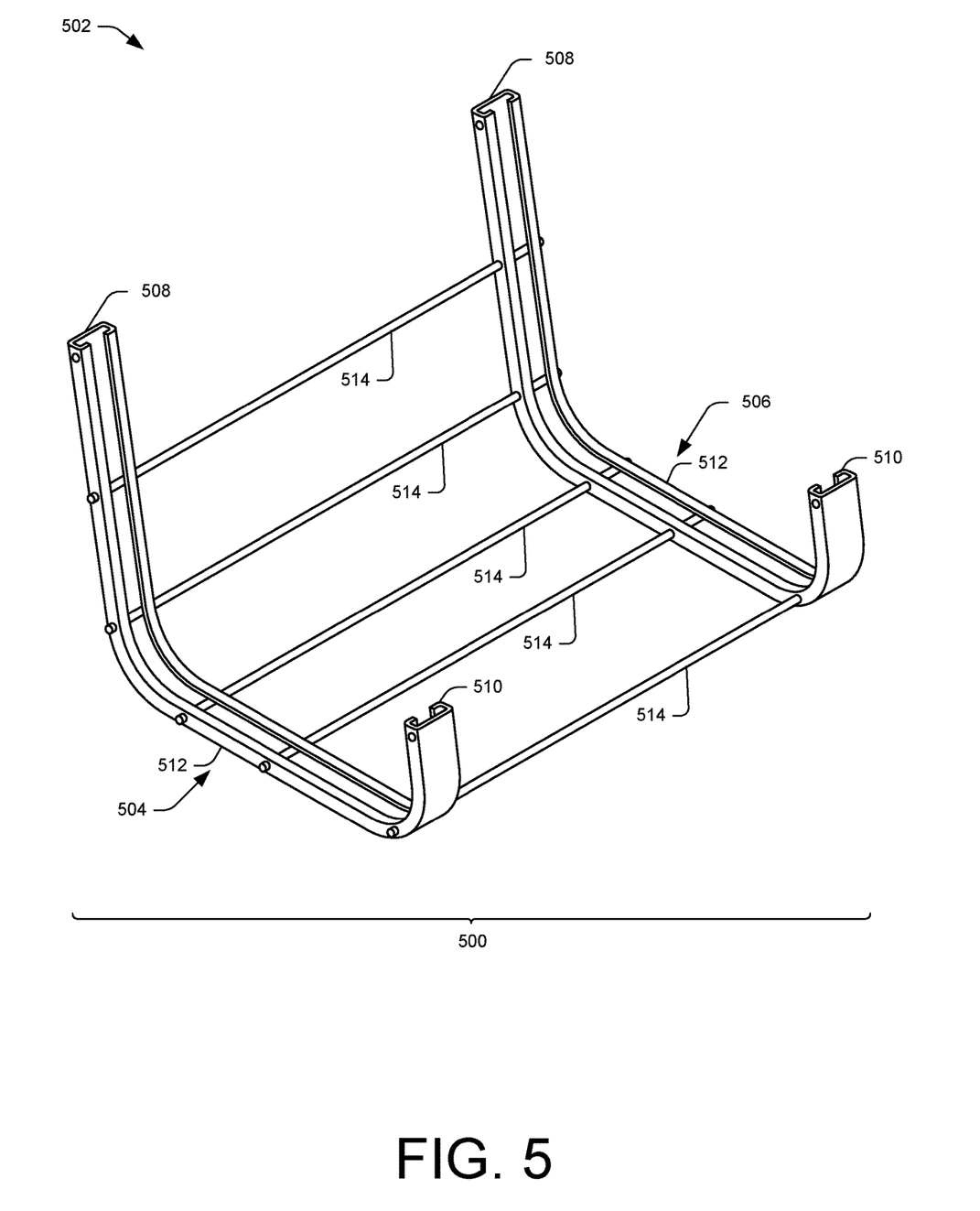
FIG. 5 illustrates a perspective view of a first ballast tray of the ballast system shown in FIG. 1, according to an embodiment of this disclosure.

FIG. 5 illustrates a perspective view 500 of a first ballast tray 502 of the ballast system 102 for surface attachment of photovoltaic modules shown in FIG. 1, according to an embodiment of this disclosure. The first ballast tray 502 may be the same as the first ballast trays 106.

FIG. 5 illustrates the first ballast tray 502 (like first ballast tray 106 of the ballast bay system 102 shown in FIGS. 1-4). First ballast tray 502 has a first sled body 504 and a second sled body 506 that are substantially the same and positioned substantially parallel to each other. The first sled body 504 and the second sled body 506 each include a south leg 508 connected to a north leg 510 via a ballast base member 512. The south leg 508 and the north leg 510 extend, respectively, transversely to a direction of extension of the ballast base member 512. In an embodiment, as shown, the south leg 508, the ballast base member 512, and the north leg 510 may all be formed in one continuous piece. Further, the south leg 508 extends vertically higher than a height of extension of the north leg 510.

The first ballast tray 502 may also include one or more cross members 514 that connect the first sled body 504 to the second sled body 506. Moreover, the first ballast tray 502 may be formed of metal (e.g., aluminum, steel, stainless steel, etc.), plastic, composite, etc.

Figure 6:
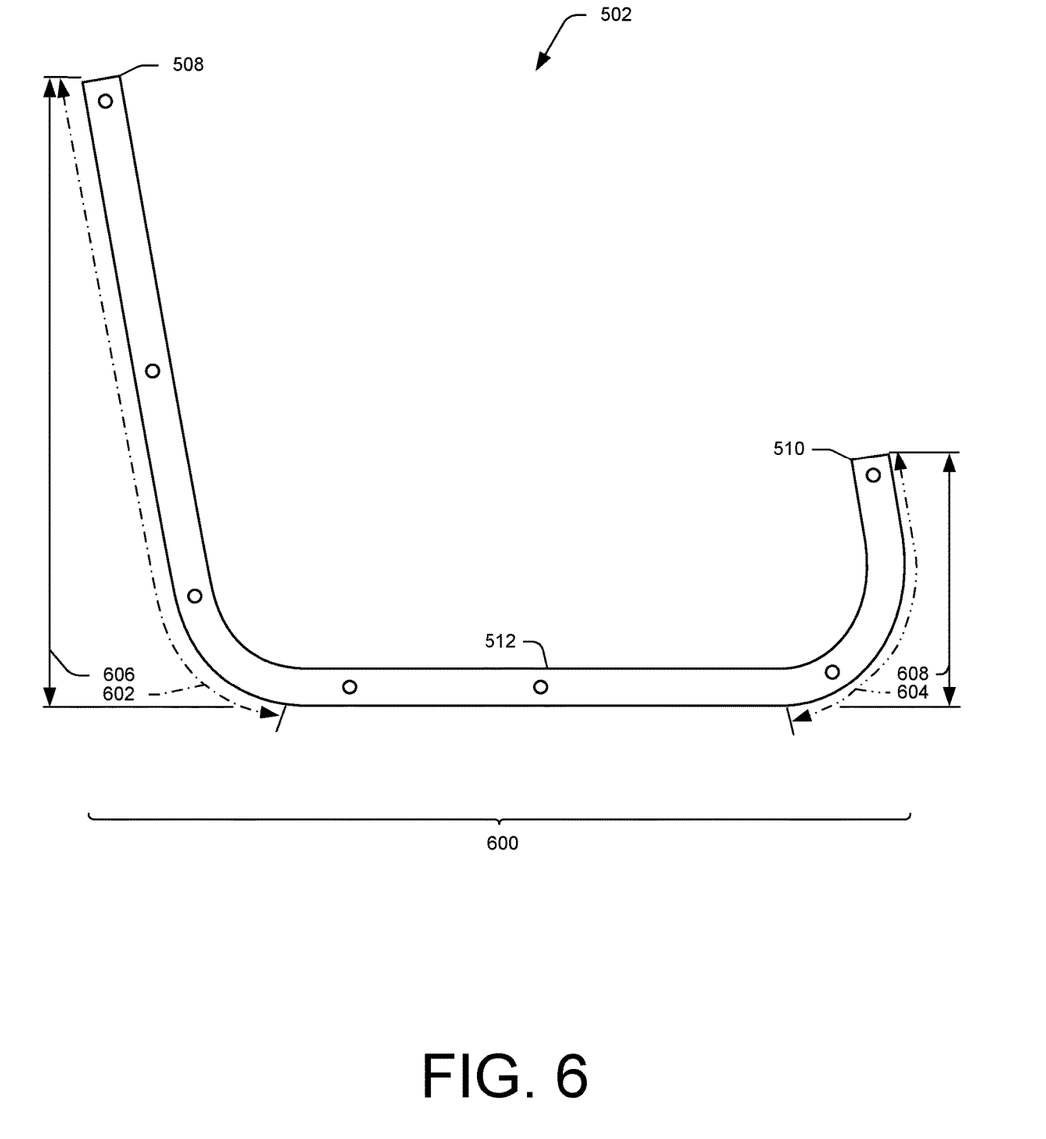
FIG. 6 illustrates a side profile view of the first ballast tray shown in FIG. 5, according to an embodiment of this disclosure.

FIG. 6 illustrates a side profile view 600 of the first ballast tray 502 shown in FIG. 5, depicts the south leg 508 being a first length 602 that is greater than a second length 604 of the north leg 510. That is, the south leg 508 has a height 606 greater than a height 608 of the north leg 510, as indicated above.

Figure 7:
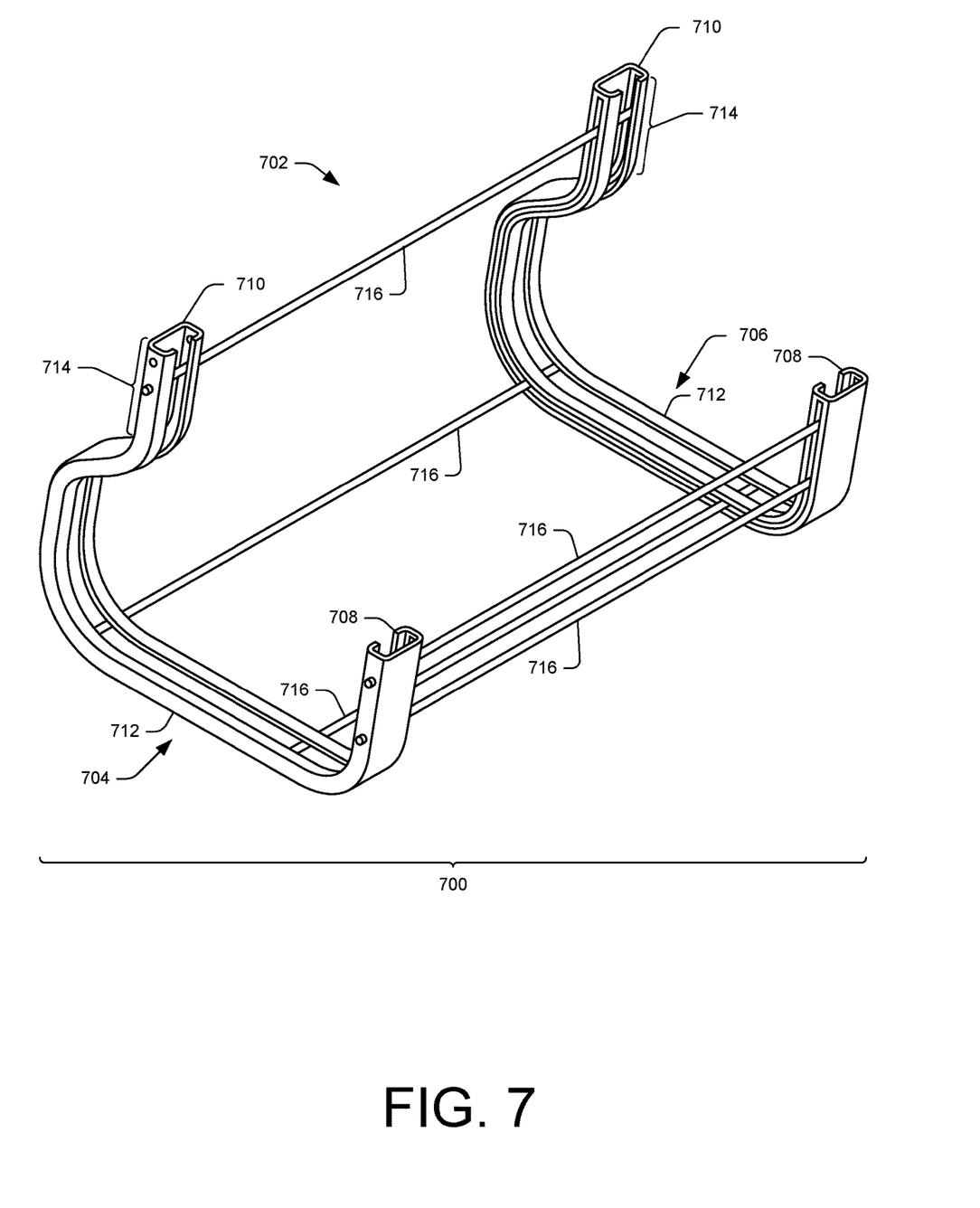
FIG. 7 illustrates a perspective view of a second ballast tray of the ballast system shown in FIG. 1, according to an embodiment of this disclosure.

FIG. 7 illustrates a perspective view 700 of a second ballast tray 702 (like second ballast tray 108 of the ballast system 102 shown in FIGS. 1-3). The second ballast tray 702 has a first sled body 704 and a second sled body 706 that are substantially the same and positioned substantially parallel to each other. The first sled body 704 and the second sled body 706 each include a south leg 708 connected to a north leg 710 via a ballast base member 712. The south leg 708 and at least a portion 714 of the north leg 710 extend, respectively, transversely to a direction of extension of the ballast base member 712. In an embodiment, as shown, the south leg 708, the ballast base member 712, and the north leg 710 may all be formed in one continuous piece. Further, the north leg 710 extends vertically higher than a height of extension of the north leg 708.

The second ballast tray 702 may include cross members 716 that connect the first sled body 704 to the second sled body 706. Moreover, the second ballast tray 702 may be formed of metal (e.g., aluminum, steel, stainless steel, etc.), plastic, composite, etc.

Figure 8:
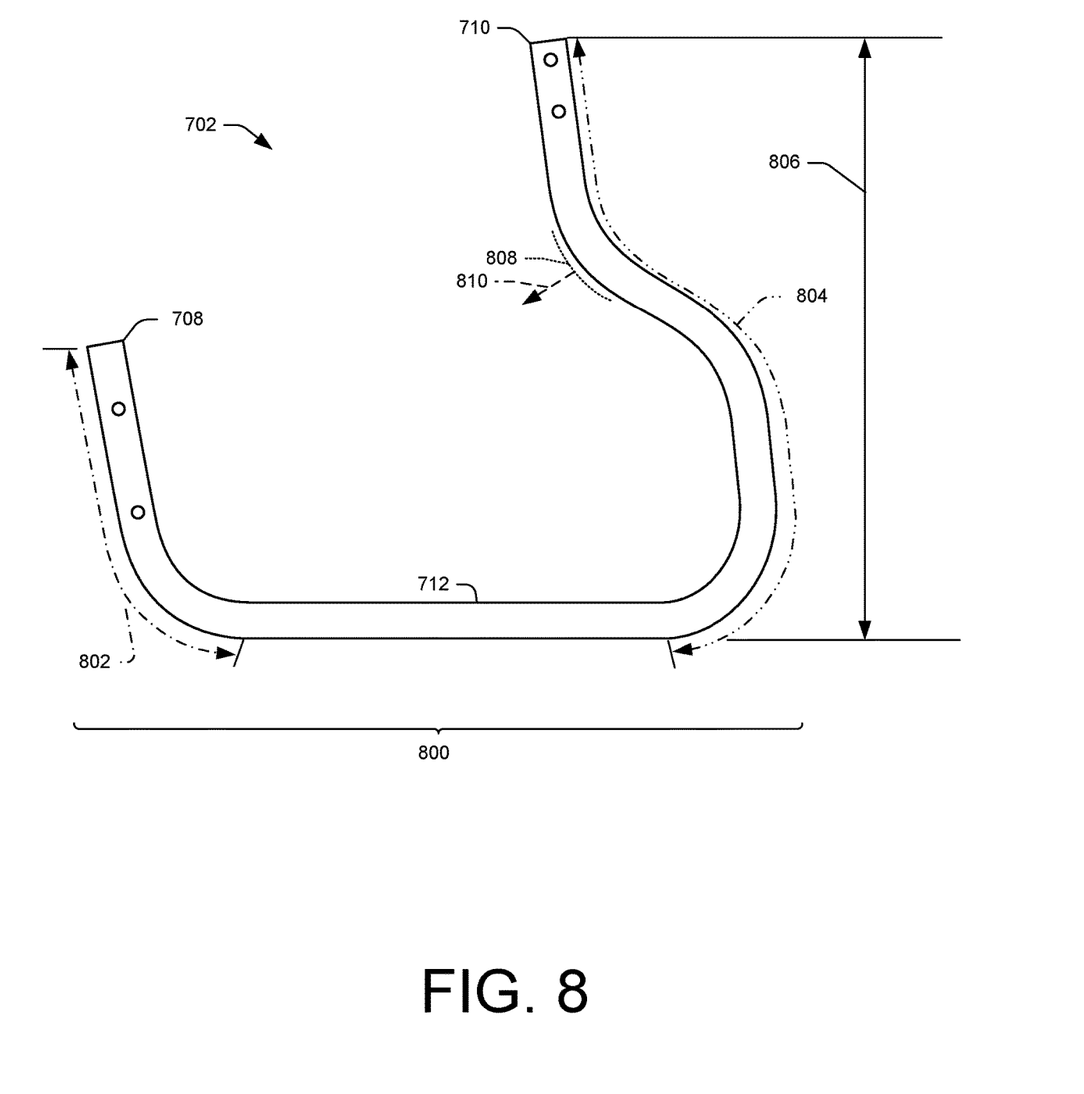
FIG. 8 illustrates a side profile view of the second ballast tray shown in FIG. 7, according to an embodiment of this disclosure.

FIG. 8 illustrates a side profile view 800 of the second ballast tray 702 shown in FIG. 7, depicts the south leg 708 being a first length 802 that is less than a second length 804 of the north leg 710. The second length 804 of the north leg 710 of the side profile of the second ballast tray 702 is greater than the first length 602 of the south leg 508 of the side profile of the first ballast tray 502. A height 806 of the north leg 710 of the side profile of the second ballast tray 702 is substantially equal to the height 606 of the south leg 508 of the side profile of the first ballast tray 502. Additionally, the north leg 710 of the side profile of the second ballast tray 702 includes a non-linear extension of a curvature 808 in a first direction, then extending in a second direction away from the first direction to partially curve in a direction 810 toward the south leg 708 of the side profile of the second ballast tray 702. In an embodiment, the curvature 808 forms an S-shape (at least partially) of curvature. The side profile of the second ballast tray 702 including the curvature 808 provides a greater general downward resistance against undesired lift when compared with the use of the first ballast trays 106 having the first side profile including the linear extension of both of the south leg 508 and of the north leg 510 thereof. Moreover, the different shaped second side profile of the second ballast tray creates an additional measure of protection against upward lift caused by wind, as the different shaped second side profile of the second ballast tray further draws PV modules back downward with additional force than with the first ballast tray as they used to use having the same side profile.

Figure 9:
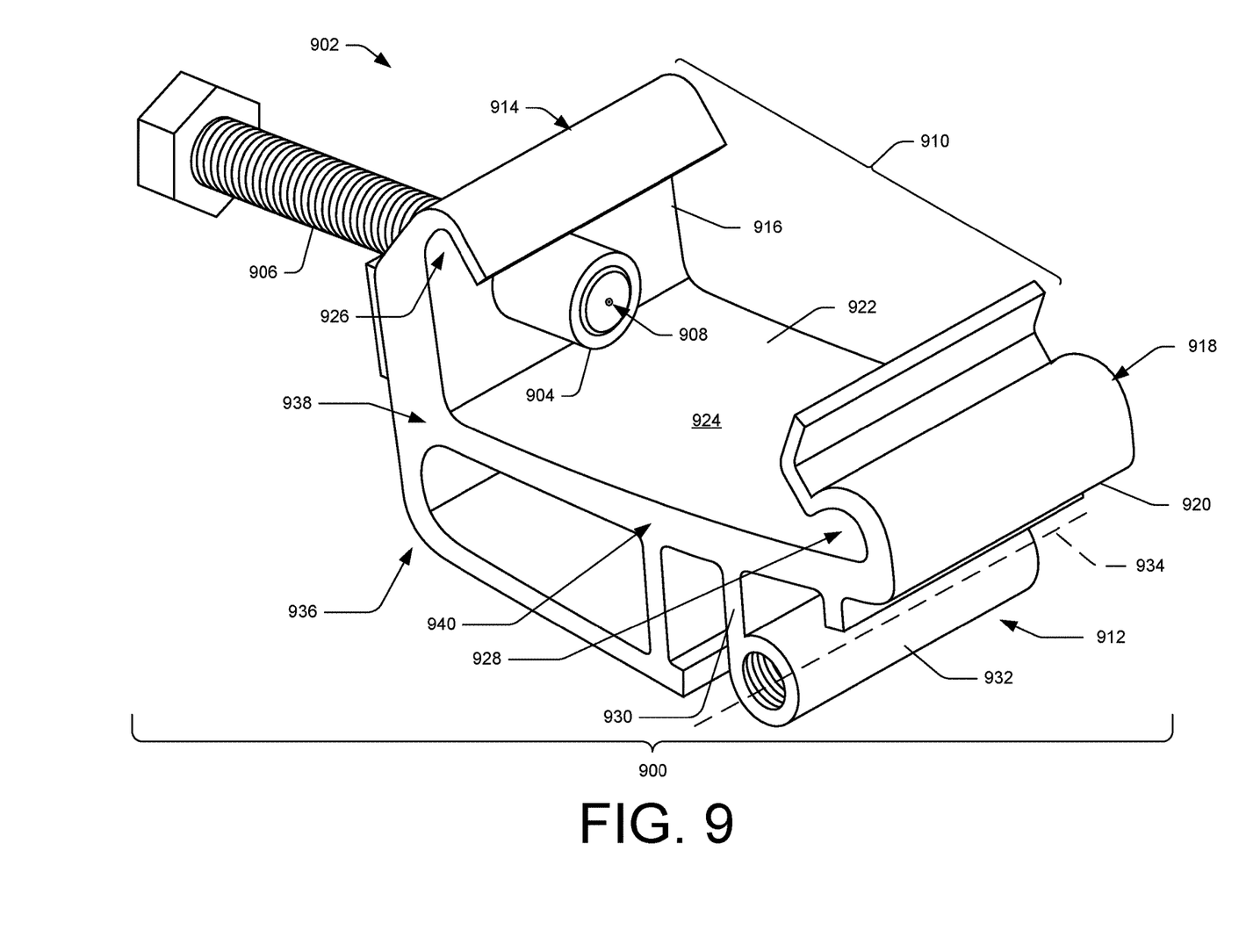
FIG. 9 illustrates a perspective view of a module clamp of the ballast system shown in FIG. 1, according to an embodiment of this disclosure.

FIG. 9 illustrates a perspective view 900 of a module clamp 902 of the ballast system 102 shown in FIG. 1, according to an embodiment of this disclosure. The module clamp 902 may be the same as the module clamps 302, 304, 402, or 404. The module clamp 902 may include a bonding cap 904. The bonding cap 904 may be attached to a fastener 906. When the module clamp 902 is attached to a forward end (e.g., forward end 206) or a rearward end (e.g., rearward end 208) of a PV module (e.g., PV modules 202(1)-202(N)), the bonding cap 904 may electrically interconnect (e.g., ground) the PV module and may have one or more portions 908 (e.g., protrusion(s), serrations, teeth, etc.) for penetrating (e.g., pierce) a coating/layer (e.g., an anodized aluminum coating/layer) on the PV module.

The module clamp 902 may include a clamp portion 910 disposed above a leg attachment portion 912. The clamp portion 910 assists in clamping a first ballast tray 106 or a second ballast tray 108 to a forward end (e.g., forward end 206) or a rearward end (e.g., rearward end 208) of a PV module (e.g., PV modules 202(1)-202(N)). The clamp portion 910 may include a first catch 914, having a hook shape for example, on a first side 916 thereof, through which the fastener 906 passes, and a second catch 918, having an oppositely directed hook shape for example, on a second side 920 of the clamp portion 910. Between the first catch 914 and the second catch 918, a PV module flange rest 922 is defined in the clamp portion 910. Flange rest 922 includes a planar base 924 that extends continuously intersecting respective lower ends of the first catch 914 and the second catch 918 at opposites sides thereof. The hook shapes of the respective first catch 914 and 918 are oriented such that the concave portions 926, 928 face each other, whereby, when implemented in use, the concave portion 928 of the second catch 918 overlaps a flange of the PV module to which it is clamped, and the fastener 906 is advanced (i.e., via threading advancement, frictional compression, etc. including other existing mechanical means) toward a vertically extending side wall (see for example rearward end 208 of the PV module 202(2) in FIG. 4, from which a flange extends inwardly) of the PV module to which it is clamped. Therefore, by advancing the fastener 906, the PV module is caught in the clamp portion 910 with the flange stuck in the concave portion 928.

The leg attachment portion 912 may extend from the clamp portion 910 positioned beneath the clamp portion 910, and more specifically, beneath the flange rest 922 near the second catch 918. Further, leg attachment portion 912 may include a wall 930 extending from the flange rest 922 connected to a hollow cylinder 932 having a central axis 934 therethrough, where the axis 934 is oriented orthogonally to the direction of extension of the fastener 906. Thereby, the leg attachment portion 912 is oriented to receive a fastener (e.g., bolt) (not shown in FIG. 9) laterally with respect to the leg of the particular ballast tray to which the clamp is secured. Thus, the module clamp 902 is configured to be fastened pivotably to a top portion of a south leg (e.g., south legs 508 and/or 708) and/or a top portion of a north leg (e.g., north legs 510 and/or 710) of either or both of the first ballast trays 106 or of the second ballast trays 108, respectively. For example, the module clamp 902 may be connected to the legs of either or both of the first ballast trays 106 or of the second ballast trays 108 using a fastener (e.g., a bolt) that is driven into leg attachment portion 912 (e.g., threaded hole, clevis pin, etc.) and driven into a corresponding hole in the upper portions of the legs, as shown in FIGS. 3 and 4, for example. Grounding from the first ballast trays 106 or the second ballast trays 108 to the module clamp 902 is achieved by the fastener driven into leg attachment portion 912 and driven into the holes disposed in the top portions of the legs of either or both of the first ballast trays 106 or of the second ballast trays 108 as both the fastener and ballast bays may be mill finished.

Additionally, in an embodiment, the module clamp 902 may include a webbed support 936 that is attached at least at two spaced apart areas 938, 940 of a lower surface of the flange rest 922. As such, the webbed support 936 is disposed opposite the leg attachment portion 912 and may prevent the flange support 922 from excessive bending and preventing proper clamping of the PV module end.

Figure 10:
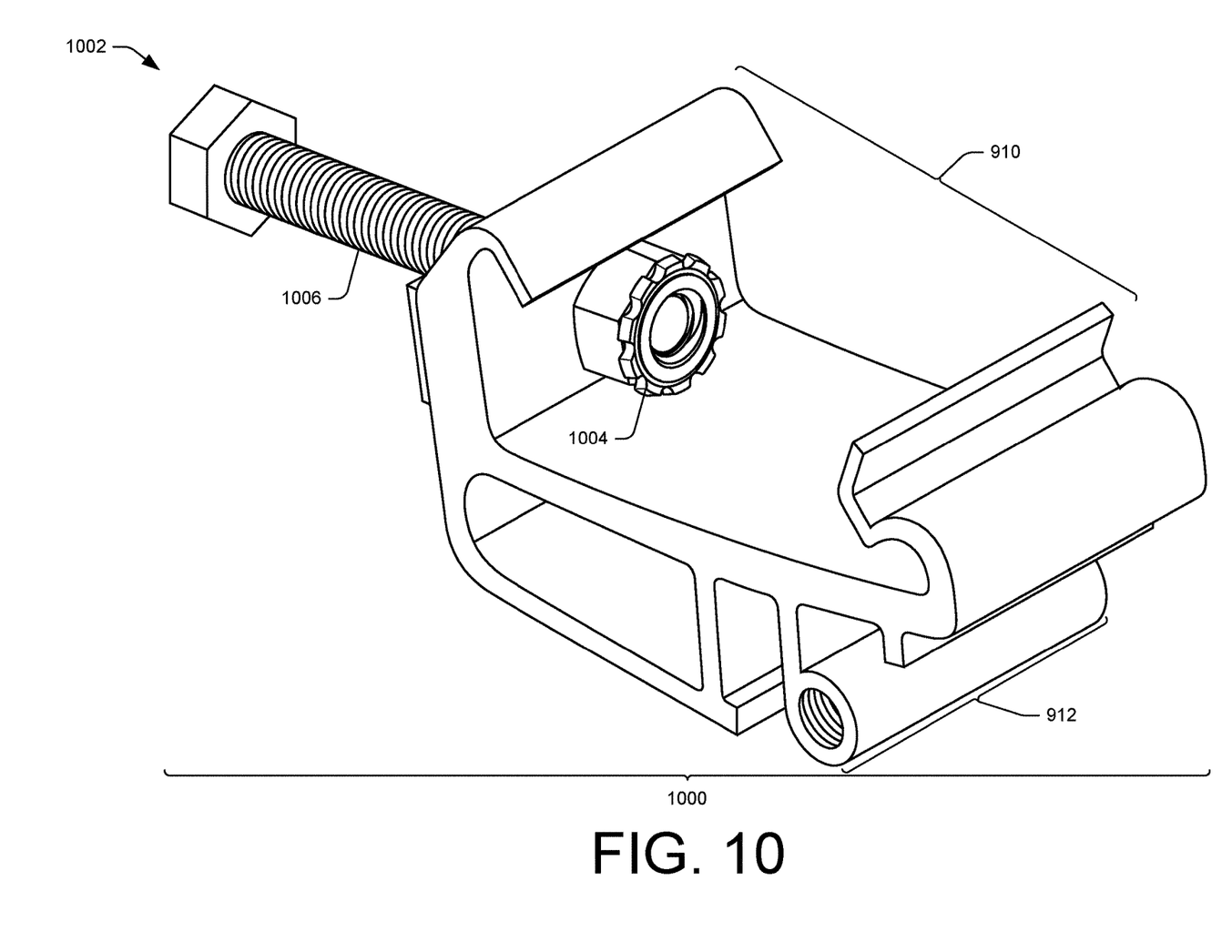
FIG. 10 illustrates a perspective view of a module clamp of the ballast system shown in FIG. 1, according to an embodiment of this disclosure.

FIG. 10 illustrates a perspective view 1000 of a module clamp 1002 of the ballast system 102 shown in FIG. 1, according to an embodiment of this disclosure. The module clamp 1002 may be the same as the module clamps 302, 304, 402, or 404. The module clamp 1002 may include a star washer bonding nut 1004. The star washer bonding nut 1004 may be attached to a fastener 1006. When the module clamp 1002 is attached to a forward end (e.g., forward end 206) or a rearward end (e.g., rearward end 208) of a PV module (e.g., PV modules 202(1)-202(N)), the star washer bonding nut 1004 may electrically interconnect (e.g., ground) the PV module and may have one or more portions (e.g., protrusion(s), serrations, teeth, etc.) for penetrating (e.g., piercing) a coating/layer (e.g., an anodized aluminum coating/layer) on the PV module.

Similar to module clamp 902, the module clamp 1002 may include the clamp portion 910 for clamping to a forward end (e.g., forward end 206) or a rearward end (e.g., rearward end 208) of a PV module (e.g., PV modules 202(1)-202(N)) and the leg attachment portion 912 for pivotably attaching the module clamp 902 to a top portion of a south leg (e.g., south legs 508 and/or 708) and/or a top portion of a north leg (e.g., north legs 510 and/or 710) of either or both of the first ballast trays 106 or the second ballast trays 108. As depicted, the module clamp 1002 may include similar additional other structural features, and thus, such additional similar features are not labeled or redescribed herein for the sake of brevity.

CONCLUSION

Although several embodiments have been described in language specific to structural features and/or methodological acts, it is to be understood that the claims are not necessarily limited to the specific features or acts described. Rather, the specific features and acts are disclosed as illustrative forms of implementing the claimed subject matter.

What is claimed is:

1. A ballast system to secure a plurality of photovoltaic modules, the ballast system comprising:
    a first ballast tray including:
        a ballast base member disposed in a first direction,
        a south leg extending from a first end of the ballast base member of the first ballast tray in a second direction that is transverse to the first direction, the south leg of the first ballast tray having a first length, and
        a north leg extending from a second end of the ballast base member of the first ballast tray in the second direction, the north leg of the first ballast tray having a second length that is shorter than the first length; and
    a second ballast tray including:
        a ballast base member disposed in the first direction,
        a south leg extending from a first end of the ballast base member of the second ballast tray in the second direction, the south leg of the second ballast tray having a third length, and
        a north leg having:
            a first portion extending from a second end of the ballast base member of the second ballast tray in the second direction,
            a second portion extending from the first portion in a third direction that is transverse to the second direction,
            a third portion extending from the second portion in the second direction, and
            a fourth length defined by adding respective lengths of the first portion, the second portion, and the third portion, the fourth length being greater than the third length, the fourth length being greater than the first length.

2. The ballast system of claim 1, wherein:
    a first photovoltaic module of the plurality of photovoltaic modules has a forward end and a rearward end opposite the forward end; and
    the forward end is attached to the north leg of the first ballast tray and the rearward end is attached to the north leg of the second ballast tray such that the first photovoltaic module is supported by the first ballast tray and the second ballast tray in an inclined position.

3. The ballast system of claim 2, wherein the first ballast tray and the second ballast tray are void of a direct connection to one another.

4. The ballast system of claim 2, wherein the first ballast tray is not fastened to a support surface or the second ballast tray is not fastened to the support surface.

5. The ballast system of claim 2, further comprising:
a third ballast tray including:
a ballast base member extending in the first direction,
a south leg extending from a first end of the ballast base member of the third ballast tray in the second direction, the south leg of the third ballast tray having the first length,
a north leg extending from a second end of the ballast base member of the third ballast tray in the second direction, the north leg of the third ballast tray having the second length; and
a second photovoltaic module of the plurality of photovoltaic modules, the second photovoltaic module having a forward end and a rearward end opposite the forward end, wherein the forward end of the second photovoltaic module is attached to the north leg of the third ballast tray and the rearward end of the second photovoltaic module is attached to the south leg of the first ballast tray such that the second photovoltaic module is supported by the first ballast tray and the third ballast tray in the inclined position.

6. The ballast system of claim 1, further comprising:
a first module clamp attached to the north leg of the first ballast tray for attaching a forward end of at least one photovoltaic module of the plurality of photovoltaic modules; or
a second module clamp attached to the north leg of the second ballast tray for attaching a rearward end of the at least one photovoltaic module of the plurality of photovoltaic modules.

7. The ballast system of claim 1, wherein:
the ballast system secures the plurality of photovoltaic modules to a surface; and
when disposed on the surface:
the south leg of the first ballast tray extends a height above the surface, and
the north leg of the second ballast tray extends the height above the surface.

8. A ballast system to secure a plurality of photovoltaic modules, the ballast system comprising:
a first ballast tray having a first side profile including:
a south leg with a first length, and
a north leg with a second length that is less than the first length of the south leg of the first side profile; and
a second ballast tray having a second side profile that is different than the first side profile, the second side profile including:
a south leg with a first length, and
a north leg with a second length that is greater than (i) the first length of the south leg of the second side profile and (ii) the second length of the north leg of the first side profile wherein a portion of the north leg of the second side profile is non-parallel with the south leg of the second side profile so as to partially curve toward the south leg of the second side profile.

9. The ballast system of claim 8, wherein:
a first photovoltaic module of the plurality of photovoltaic modules has a forward end and a rearward end opposite the forward end; and
the forward end is attached to the north leg of the first side profile and the rearward end is attached to the north leg of the second side profile such that the first photovoltaic module is supported by the first ballast tray and the second ballast tray in an inclined position.

10. The ballast system of claim 9, wherein the first ballast tray and the second ballast tray are void of a direct connection to one another.

11. The ballast system of claim 9, wherein the first ballast tray is not fastened to a support surface or the second ballast tray is not fastened to the support surface.

12. The ballast system of claim 9, further comprising:
a third ballast tray having a third side profile that is a same as the first side profile; and
a second photovoltaic module of the plurality of photovoltaic modules, the second photovoltaic module having a forward end and a rearward end opposite the forward end, wherein the forward end of the second photovoltaic module is attached to the north leg of the third side profile and the rearward end of the second photovoltaic module is attached to the south leg of the first side profile such that the second photovoltaic module is supported by the first ballast tray and the third ballast tray in the inclined position.

13. The ballast system of claim 8, further comprising:
a first module clamp attached to the north leg of the first side profile for attaching a forward end of at least one photovoltaic module of the plurality of photovoltaic modules; or
a second module clamp attached to the north leg of the second side profile for attaching a rearward end of the at least one photovoltaic module of the plurality of photovoltaic modules.

14. The ballast system of claim 8, wherein the second length of the north leg of the second side profile is greater than the first length of the south leg of the first side profile.

15. The ballast system of claim 8, wherein a height of the north leg of the second side profile is substantially equal to a height of the south leg of the first side profile.

16. A ballast tray comprising:
a ballast base member;
a south leg connected to the ballast base member, the south leg extending transversely in a first direction that is transverse to a direction of extension of the ballast base member, and the south leg having a first length; and
a north leg including at least:
a first portion connected to the ballast base member and extending in the first direction,
a second portion connected to the first portion and at least partially curving toward the south leg extending in a second direction that is different than the first direction,
a third portion connected to the second portion and extending in a third direction that is substantially similar to the first direction, and
a second length that is greater than the first length, the second length being defined by the first portion, the second portion, and the third portion.

17. The ballast tray of claim 16, wherein the ballast tray is disposed on an outer-most edge of a photovoltaic module array.

18. The ballast tray of claim 16, wherein the ballast tray is not fastened to a support surface.

19. The ballast tray of claim 16, further comprising a module clamp, the module clamp fastened to the north leg.

20. The ballast tray of claim 19, wherein the module clamp is clampable to an end of a photovoltaic module.

* * * * *